United States Patent [19]

Williams et al.

[11] Patent Number: 4,840,859
[45] Date of Patent: Jun. 20, 1989

[54] THERMAL BATTERY

[75] Inventors: Mark T. Williams, Owings Mills; Clinton S. Winchester, Beltsville; Joseph D. Jolson, Baltimore, all of Md.

[73] Assignee: Mine Safety Appliances Company, Pittsburgh, Pa.

[21] Appl. No.: 874,415

[22] Filed: Jun. 16, 1986

[51] Int. Cl.⁴ .............................................. H01M 4/60
[52] U.S. Cl. ...................................... 429/212; 429/218
[58] Field of Search ................ 429/112, 102, 20, 212, 429/213, 218, 225, 228, 232

[56] References Cited

U.S. PATENT DOCUMENTS

| | | | |
|---|---|---|---|
| 3,891,460 | 6/1975 | Bowser et al. | 136/236.1 |
| 3,930,888 | 1/1976 | Bowser et al. | 429/218 |
| 4,119,769 | 10/1978 | Schneider et al. | 429/112 |
| 4,221,849 | 9/1980 | Harney | 429/112 |
| 4,287,268 | 9/1981 | Coetzer | 429/112 X |
| 4,548,881 | 10/1985 | Nalewajek et al. | 429/218 X |

FOREIGN PATENT DOCUMENTS 2132006  6/1984  United Kingdom ............... 429/112

Primary Examiner—Brian S. Steinberger

[57] ABSTRACT

Thermal batteries comprise an anode of alkali or alkaline earth metal and a fluorocarbon polymer of fluorochlorocarbon polymer depolarizer.

13 Claims, 1 Drawing Sheet

THERMAL BATTERY

FIELD OF THE INVENTION

The invention relates to primary reserve batteries, and more particularly to batteries, known as thermal batteries, that are actuated by heating.

BACKGROUND OF THE INVENTION

Thermal batteries are a well-known type of primary reserve battery that have a long shelf life at ordinary temperatures and are actuated by heating to a temperature that melts a salt electrolyte. The batteries are useful in applications for a high energy output over a short time. The batteries comprise a plurality of cells, each of which includes an anode, a cathode, an electrolyte and a heat source, usually an ignitable exothermically reactive chemical charge or pyrotechnic. A variety of electrochemical systems are known for use in thermal cells.

The anode is an electropositive metal, commonly calcium or lithium alloys and more recently lithium as described in U.S. Pat. No. 3,930,888, U.S. Pat. No. 3,891,460 and U.S. Pat. No. 4,221,849. The electrochemical reactant of the cathodes, generally referred to as depolarizers, are electropositive materials that are reduced in the electrochemical cell reaction and include phosphates, borates, metal oxides and chromates. Calcium chromate and vanadium pentoxide have been widely used depolarizers as, more recently, has iron pyrite ($FeS_2$), described in U.S. Pat. No. 4,119,769. Under current practice powdered depolarizer is mixed with electrolyte and binder and compacted to form a homogeneous wafer cathode, which may be a layer of a composite wafer also having an electrolyte layer made up of electrolyte and binder. The electrolytes are ordinarily mixtures of alkali metal halides, most often a eutectic mixture of lithium chloride and potassium chloride. The state of the art thermal battery comprises a lithium anode immobilized with iron powder, a LiCl-KCl eutectic electrolyte immobilized with refractory powder binder, and an $FeS_2$ cathode with electrolyte and binder. A pyrotechnic heat source wafer of iron powder and potassium perchlorate is interposed between each cell.

SUMMARY OF THE INVENTION

It is an object of this invention to provide an improved thermal battery utilizing prior art anodes, in particular the molten anode of the type disclosed in U.S. Pat. No. 4,221,849 comprising lithium and about 70–85% by weight of a particulate metal capable of being wetted by molten lithium, but only slightly or not at all alloyable with lithium. A further object is to provide thermal batteries having increased voltage and power or energy output on a weight or volume basis.

The invention is based on our discovery that fluorocarbon polymers, fluorochlorocarbon polymers, fluorographie polymers and chlorofluorographite polymers can be used as depolarizers in thermal batteries. The cathode may be a film or sheet of the polymer or a compacted wafer or wafer layer of powdered polymer without or with one or more of a powdered fuse salt electrolyte and a binder of refractory powder. The preferred cathode also contains a lead or bismuth oxide or halide.

In accordance with our invention, the improved thermal battery comprises at least one electrochemical cell having an anode of alkali metal, alkaline earth metal, or alloys thereof. Preferably, the metal is lithium. While solid alloys may be used, it is preferred that the anode comprise lithium, molten at operating temperature, and iron powder disposed on top of an expanded metal screen in a metal cup.

The cathode, preferably in wafer form, comprises a powdered fluorocarbon polymer or fluorochlorocarbon polymer depolarizer, such as, for example polytetrafluoroethylene (PTFE), fluorinated ethylene-propylene copolymers (FEP), polyvinylfluoride (PE), polyvinylidine fluoride (PVDF), polychlorotrifluoroethylene (PCTFE), or fluorographite polymers ($CF_x$), chlorofluorographite polymers ($CF_xCL_y$), and perfluorosulfonates (PFS). Illustrative of such suitable materials are Teflon ® and Nafion ® (E. I. DuPont), Kel-F ® (eM), Accuflor ® (Allied), Fluorographite ® (Pennwalt) and the chlorofluoronated carbons disclosed in U.S. Pat. No. 4,548,881. Although the cathode may consist entirely of depolarizer, it is preferred that the cathode also includes electrolyte and a binder, which may be a refractory, for example silica, alumina, magnesium oxide or carbon. Improved performance is obtained if the cathode also contains one or more of a bismuth halide, a lead halide, a bismuth oxide or a lead oxide, for example $BiF_3$, $BiCl_3$, $PbF_2$ or PbO.

A cathode containing electrolyte can be spaced by a porous separator from anode, but it is generally preferred to interpose only electrolyte with binder between them. A compacted mixture of electrolyte and binder can be used as a separate wafer adjacent the anode or a separate layer in a composite wafer also having a cathode layer. Mixtures of alkali metal halides are suitable electrolytes, as are other inert salts that do not decompose at the battery operating temperature. LiCl-KCl eutectic is a preferred electrolyte because of its relatively low melting point of 352° C.

DESCRIPTION OF THE INVENTION

EXAMPLE I

Figure 1:
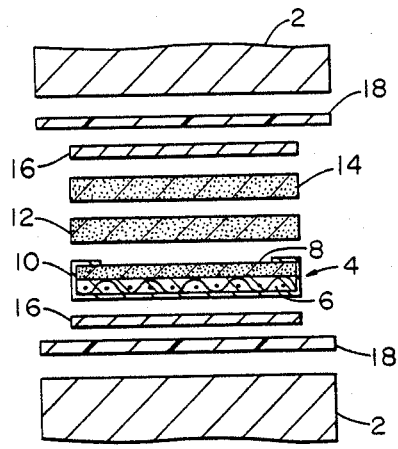
FIG. 1 is an exploded cross-sectional view of a single cell heated by platens.

With reference to FIG. 1, single cells heated by platens 2 incorporated an anode assembly 4 comprising an anode 8 of 19% lithium and 81% iron and expanded metal screen 6 contained in a metal cup 10. Electrolyte wafer 12, is 50% LiCl-KCl eutectic (0.5 g.) with 50% of MgO binder (0.5 g.), compressed at about 20–28 tons per square inch (tsi). Cathode wafers 14 were made up in a variety of formulations, as later described, by compressing the mixed components into a wafer at about 20–28 tsi. The cell elements are 1⅜ inch diameter. Iron current collector sheets 16 were connected by leads, not shown, to electrical measuring instruments and electrical loads. The cell was electrically insulated from the platens by insulators 18. The platens were heated and brought toward each other to hold the cell elements in a stack under compression. The hot platens heat the cell rapidly to an equilibrium temperature actuating the cell, giving the output indicated in Table I. The cell elements in Battery Nos. 1-9, and 1 and 2 comp were 1¾" in diameter; in the remainder of the batteries, the elements were 1⅜" in diameter.

TABLE I

| BATTERY NO. | CATHODE COMPOSITION & WEIGHT | | TEMP °C. and LOAD (OHMS) | VOLTAGE (VOLTS) AFTER | | |
|---|---|---|---|---|---|---|
| | | | | 48 SEC. | 240 SEC. | 480 SEC. |
| 1 | PTFE (1) | 45% | 500° | 2.4 | 2.6 | 2.6 |
| | E (2) | 29.25% | Open | | | |
| | C | 15.75% | Circuit | | | |
| | BiF | 10% | | | | |
| 2 | PTFE | 25% | 500° | 3.6 | 3.4 | 3.3 |
| | CF (3) | 25% | Open | | | |
| | E | 18.75% | Circuit | | | |
| | C | 6.25% | | | | |
| | BiF | 25% | | | | |
| 1 comp (6) | FeS | 75% | 500° | 2.2 | 2.1 | 2.1 |
| | E | 21.5% | Open | | | |
| | SiO (4) | 3.5% | Circuit | | | |
| 3 | PTFE | 50% | 400° | 1.6 | 1.6 | 1.7 |
| | E | 50% | 1 | | | |
| 4 | PTFE | 47.5% | 400° | 1.7 | 1.8 | 1.8 |
| | E | 47.5% | 1 | | | |
| | C | 5% | | | | |
| 5 | CTFE (5) | 49.5% | 400° | 1.8 | 1.5 | — |
| | E | 24.74% | 1 | | | |
| | MgO | 24.75% | | | | |
| | C | 1% | | | | |
| 6 | PTFE | 49.5% | 500° | 1.9 | 1.9 | 1.8 |
| | E | 24.75% | 1 | | | |
| | MgO | 24.75% | | | | |
| | C | 1% | | | | |
| | | 0.75 g. | | | | |
| 7 | PTFE | 49.5% | 500° | 1.8 | 1.9 | 1.7 |
| | E | 35.64% | 1 | | | |
| | SiO | 13.86% | | | | |
| | C | 1% | | | | |
| | | 0.75 g. | | | | |
| 8 | PFA | 32.7% | 500° | 2.1 | 1:2 | — |
| | E | 32.7% | 1 | | | |
| | MgO | 32.7% | | | | |
| | C | 1.9% | | | | |
| | | 0.5 g. | | | | |
| 9 | CF | 49.5% | 500° | 2.1 | 0.9 | — |
| | E | 24.75% | 1 | | | |
| | MgO | 24.75% | | | | |
| | C | 1% | | | | |
| | | 0.3 g. | | | | |
| 2 comp. | FeS | 75% | 500° | 1.85 | 1.8 | 1.6 |
| | E | 21.5% | 1 | | | |
| | SiO | 3.5% | | | | |
| | | 1.35 g. | | | | |
| 10 | PTFE | 50% | 500° | 1.9 | 1.9 | 1.8 |
| | E | 37.5% | 2 | | | |
| | C | 12.5% | | | | |
| | | 0.6 g. | | | | |
| 11 | PTFE | 37.5% | 500° | | | |
| | CF | 25% | | | | |
| | E | 28.12% | | | | |
| | C | 9.38% | | | | |
| | | 0.6 g. | | | | |
| 12 | PTFE | 33.3% | 500° | 1.6 | 1.4 | — |
| | LiF—NaF—KF | 25% | 2 | | | |
| | C | 8% | | | | |
| | BiF | 33.3% | | | | |
| | | 0.6 g. | | | | |
| 13 | PTFE | 25% | 500° | 2,3 | 2.1 | — |
| | E | 18.75% | 2 | | | |
| | C | 6.25% | | | | |
| | BiF | 50% | | | | |
| | | 0.6 g. | | | | |
| 14 | PTFE | 80% | 500° | 1.9 | 1.9 | 1.9 |
| | E | 6.75% | 2 | | | |
| | C | 8.25% | | | | |
| | BiF | 5% | | | | |
| | | 0.37 g. | | | | |
| 15 | PTFE | 45% | 500° | 2.1 | 2.2 | — |
| | E | 38.25% | 2 | | | |
| | C | 6.75% | | | | |
| | BiF | 10% | | | | |
| | | 0.6 g. | | | | |
| 16 | PTFE | 49.95% | 500° | 2.0 | 1.9 | 1.1 |
| | E | 27.47% | 2 | | | |
| | C | 22.48% | | | | |
| | BiF | 0.1% | | | | |
| | | 0.45 g. | | | | |

TABLE I-continued

| BATTERY NO. | CATHODE COMPOSITION & WEIGHT | | TEMP °C. and LOAD (OHMS) | VOLTAGE (VOLTS) AFTER | | |
|---|---|---|---|---|---|---|
| | | | | 48 SEC. | 240 SEC. | 480 SEC. |
| 17 | PTFE | 45% | 500° | 2.3 | 2.25 | 1.25 |
| | E | 29.25% | 2 | | | |
| | C | 15.75% | | | | |
| | BiF | 10% | | | | |
| | | 0.6 g. | | | | |
| 18 | PTFE | 25% | 500° | 2.85 | 2.1 | — |
| | CF | 21% | 2 | | | |
| | E | 24.75% | | | | |
| | C | 8.25% | | | | |
| | BiF | 21% | | | | |
| | | 0.6 g. | | | | |
| 19 | PTFE | 25% | 500° | 2.5 | 2.0 | — |
| | CF | 25% | 2 | | | |
| | C | 6.25% | | | | |
| | BiF | 25% | | | | |
| | | 0.6 g. | | | | |
| 20 | CF | 33% | 500° | 2.75 | 2.3 | — |
| | E | 24.75% | 2 | | | |
| | C | 8.25% | | | | |
| | BiF | 33% | | | | |
| | | 0.52 g. | | | | |
| 3 | FeS | 75% | 500° | 1.9 | 1.9 | — |
| | E | 21.5% | 2 | | | |
| | SiO | 3.5% | | | | |
| | | 0.6 g. | | | | |
| 21 | PTF | 50% | 500° | 2.0 | 2.2 | 1.9 |
| | E | 33.98% | 2 | | | |
| | C | 7.88% | | | | |
| | SiO | 3.15% | | | | |
| | BiF | 5% | | | | |
| | | 0.42 g. | | | | |
| 22 | PTFE | 50% | 500° | 2.1 | 2.1 | 1.8 |
| | E | 29.25% | 2 | | | |
| | C | 15.75% | | | | |
| | BiF | 5% | | | | |
| | | 0.4 g. | | | | |
| 23 | PTFE | 33% | 500° | 2.2 | 2.1 | — |
| | E | 21.45% | 2 | | | |
| | C | 11.55% | | | | |
| | PbF | 33% | | | | |
| | | 0.45 g. | | | | |
| 24 | PTFE | 33% | 500° | 2.0 | 2.15 | 1.2 |
| | E | 21.45% | 2 | | | |
| | C | 11.55% | | | | |
| | BiCl | 33% | | | | |
| | | 0.58 g. | | | | |

(1) Teflon 7A
(2) LiCl—KCl Eutectic
(3) Accufluor
(4) Cab-O-Sil
(5) Kel-F
(6) Comparative example The proportions of cathode components are not critical and can be varied over wide ranges to accommodate specific battery requirements. It will be recognized that even though the theoretical capacity of the cathode is directly related to the proportion of depolarizer, desirable cathodes will contain electrolyte and binder to provide reproduceable, more uniform performance over the life of the cell. The use of lead or bismuth oxide or halides generally provides high voltages under load over the entire cell life. The cathode may contain up to about 80% by weight electrolyte, up to about 50% by weight binder and up to 50% by weight lead or bismuth compound, and it is generally preferred to use at least about 20% by weight of depolarizer.

Illustrative of the improved performance of now preferred cathodes the Table II shows amp-hours of energy and watt-hours of power produced at voltages above 75% of peak voltage, based on cathode weight and volume:

TABLE II

| Battery No. | | Ahr/g. | Whr/g | Ahr/cc. | Whr/cc |
|---|---|---|---|---|---|
| 17 | | 0.223 | 0.491 | 0.487 | 1.07 |
| 20 | | 0.175 | 0.424 | 0.340 | 0.823 |
| 3 | Comparative | 0.170 | 0.323 | 0.418 | 0.794 |

Although the energy density of the $CF_x$ battery is somewhat less than the comparative $FeS_2$ battery, the power density is higher and it will be noted from Table I that the $CF_x$ battery delivers a significantly higher voltage.

EXAMPLE II

The depolarizer can also be used in the form of a sheet or film. A cell made as in Example I, except the cathode was a 3 mil film of Nafion (PFS) giving only about two-thirds the amount of depolarizer as the previous examples, at 500° C. and connected to a 1 ohm load, reached a voltage of 1.6 volts and maintained a voltage above 1 volt for about 48 seconds.

EXAMPLE III

A cell was made as in Example II, except 0.25 g. PTFE film was used in place of the PFS. This cell at 500° C. and a 1 ohm load reached a peak voltage of 18 v and maintained a voltage above 1 v for a period of about 288 seconds.

Figure 3:
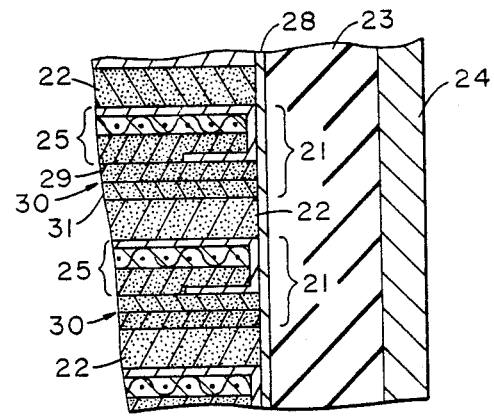
FIG. 3 is an enlarged view of a portion of the battery shown in FIG. 2.
Figure 2:
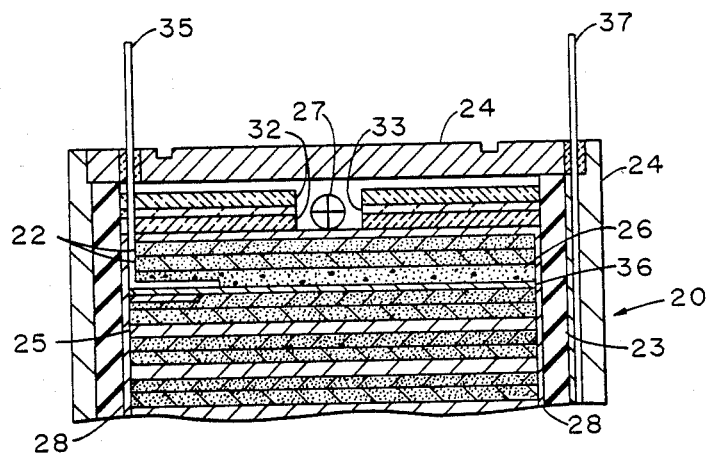
FIG. 2 is a cross-sectional view of a multicell battery.
Figure 2:
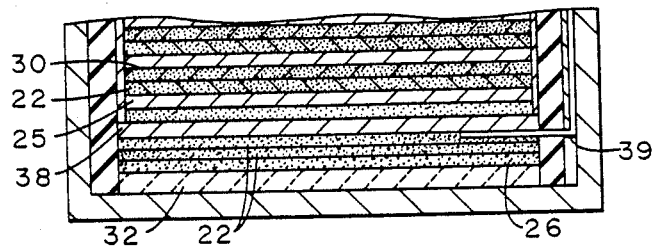

With reference to FIGS. 2 and 3, a thermal battery 20 of the present invention includes a plurality of stacked electrochemical cell elements 21, as in the cell of FIG. 1, together with an ignitable chemical heat source 22. Cells 21 are surrounded by thermal and electrical insulation 23 and are maintained in compression by metal housing 24. Each cell comprises an anode assembly 25, an electrolyte wafer 29 and a cathode wafer 31, which may be consolidated as a single element 30, and a cathode current collector. Preferably, the cathode current collector is incorporated into or comprises combustible composition 22 which provides electrical connection between the cells and provides thermal energy to the ends of the cell stack. Asbestos disc 26 is a thermal insulator. An electrical match or squib 27 is provided to activate the battery and is connected to electrical lead not shown and is in contact with fuse strip 28 which is ignited by electrical match 27 and which, in turn, ignites each wafer of combustible material 22. Insulators 32 are positioned on the end of the cell stack to serve as a temperature buffer and preferably comprise asbestos discs. Additional insulator 33 is interposed between top insulators 32.

Positive current collector 35 is connected to metal current collector 36 and extends through the insulation and housing, and is suitably sealed. Negative terminal 37 is electrically connected to metal current collector 38 and combustible composition pellet 22 by means of lead 39.

EXAMPLE IV

In a fourteen cell battery, as illustrated in FIG. 2, each cell comprised an 0.64 g. anode of 15-30% lithium and 70-85% iron, a 1.5 g. electrolyte wafer of 50% LiCl-KCl eutectic and 50% MgO binder, a 1.00 g. cathode wafer of 49.5% PTFE, 24.75% LiCl-KCl eutectic, 24.74% MgO and 1% carbon. The cross sectional area of the cell elements was 2.4 sq. in. The heating composition between each cell was a 2.5 g. wafer of 86% Iron and 14% potassium perchlorate. On activation at 500° C., connected to a 2 ohm load, the cell reached a voltage of 30.5 v and maintained a voltage above 27 volts for a period of 90 seconds.

In a similar 14 cell battery using PTFE film cathode (1.25 g. per cathode), and connected across a 10 ohm load, a maximum of 28 volts was reached, and a voltage over 10 v has maintained for about 35 seconds.

It has been observed that in some instances a portion of the cathode in direct contact with the combustible composition is destroyed, reducing battery capacity. We have found it desirable to use a thin sheet of metal, suitably nickel or stainless steel, interposed between the combustible composition 22 and the cathode 31, to distribute the heat generated by the combustible composition.

We claim:

1. A thermal battery comprising at least one electrochemical cell comprising an anode of alkali metal, alkaline earth metal or alloys thereof, a fusible salt electrolyte, a fluorocarbon polymer or fluorochlorocarbon polymer depolarizer, and means for heating the cell to melt the electrolyte.

2. A battery according to claim 1 in which the depolarizer is selected from polytetrafluoroethylene, polychlorotrifluoroethylene, fluorinated ethylene-propylene copolymers, polyvinylfluoride and polyvinylidine fluoride.

3. A battery according to claim 1 in which the depolarizer is in the form of a cathode wafer admixed with electrolyte.

4. A battery according to claim 1 in which the depolarizer is in the form of a cathode wafer admixed with a refractory binder.

5. A battery according to claim 4 in which the cathode includes electrolyte.

6. A battery according to claim 3 in which the cathode contains an oxide or halide of lead or bismuth in an amount sufficient to increase voltage under load.

7. A battery according to claim 3 in which the depolarizer is selected from polytetrafluoroethylene polychlorotrifluoroethylene, fluorinated ethylene-propylene copolymers, polyvinylfluoride and polyvinylidine fluoride.

8. A battery according to claim 7 in which the cathode contains a refractory binder.

9. A battery according to claim 8 in which the cathode contains an oxide or halide of lead or bismuth.

10. A battery according to claim 1 in which the anode is fusible at the operating temperature of the battery.

11. A battery according to claim 10 in which the anode is lithium and particulate iron.

12. In a thermal battery having an anode comprising an anode of a fusible alkali metal or alloys thereof, a cathode comprising a mixture of depolarizer, electrolyte and binder, and a combustible heat generating pellet, the improvement comprising in combination therewith, the depolarizer consisting of a fluorocarbon polymer or fluorochlorocarbon polymer.

13. In a thermal battery of claim 12, wherein the depolarizer is selected from polytetrafluoroethylene, poly-chlorotrifluoroethylene, fluorinated ethylene-propylene copolymers, polyvinylfluoride and polyvinylidine fluoride.

* * * * *

UNITED STATES PATENT OFFICE
CERTIFICATE OF CORRECTION

PATENT NO. : 4,840,859

DATED : June 20, 1989

INVENTOR(S) : Mark T. Williams, Clinton S. Winchester, Joseph D. Jolson

It is certified that error appears in the above-identified patent and that said Letters Patent is hereby corrected as shown below:

Col. 1, lines 57-58, after "polymer" (first occurrence) "fluorocarbon" should read --chloroflurocarbon polymers, flurographite polymers and chlorofluorographite polymers can be used as depolarizers in thermal batteries--.

Col. 2, line 10, after "polyvinylfluoride" delete "(PE)" and substitute therefor --(PVE)--;

Col. 2, line 15, after "Kel-F(R)" delete "(eM)" and substitute therefor --(3M)--;

Col. 7, line 5, after "of" delete "18" and substitute therefor --1.8--; and

Col. 8, line 32, after "polytetrafluoroethylene" insert --,--.

Signed and Sealed this

Eighth Day of May, 1990

Attest:

HARRY F. MANBECK, JR.

*Attesting Officer*   *Commissioner of Patents and Trademarks*